March 21, 1944. H. S. FIKE 2,344,542
BICYCLE REFLECTING ELEMENT
Filed March 20, 1941
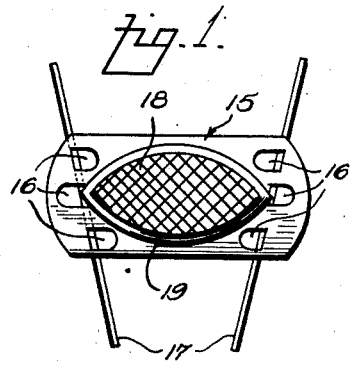
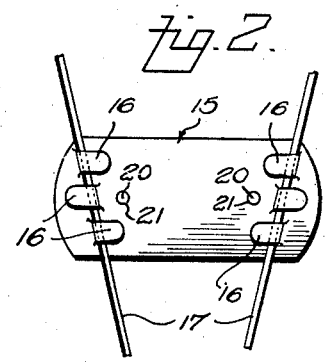
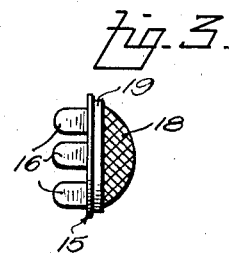
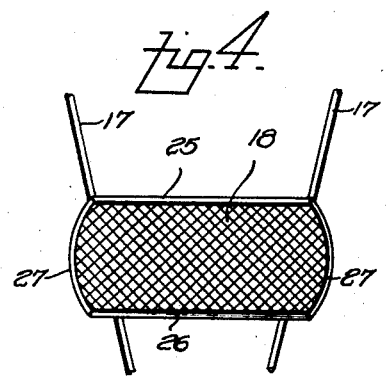
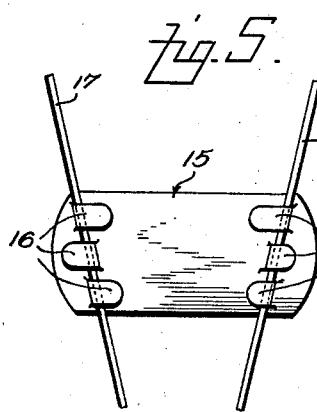
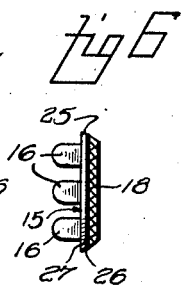
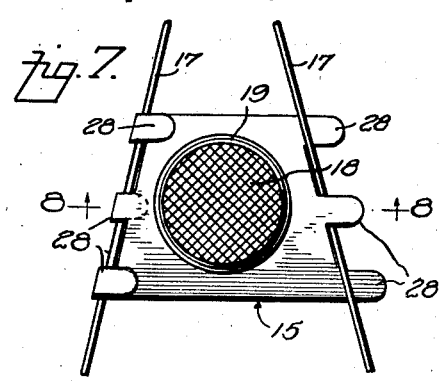
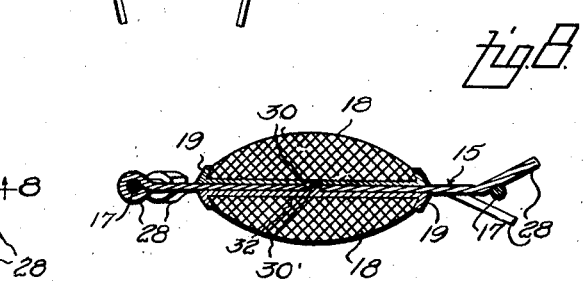
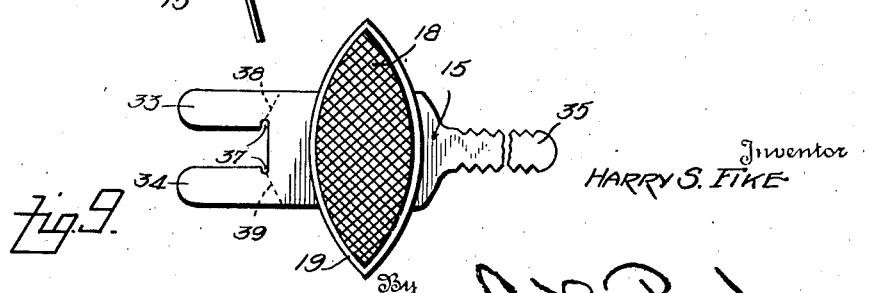
Inventor
HARRY S. FIKE Patented Mar. 21, 1944

2,344,542

UNITED STATES PATENT OFFICE 2,344,542

BICYCLE REFLECTING ELEMENT

Harry S. Fike, Miami Beach, Fla.

Application March 20, 1941, Serial No. 384,400

7 Claims. (Cl. 88—81)

This invention relates to light reflecting elements and particularly to the type which are adapted to be mounted on bicycles and other vehicles to act as warning signals to approaching vehicles.

It is a chief object of this invention to overcome the danger arising from insufficient lighting on a vehicle by providing a light reflecting assembly which may be quickly attached to the spokes of the wheels of the vehicle so that upon motion of the vehicle, the rotation of the wheels causes such light reflecting element to describe a circular path while reflecting the rays of the lights of approaching vehicles, and especially those approaching from the sides, so as to be clearly discernible.

It is a further object to provide a light reflecting element having novel supporting means by which it may be quickly and easily fastened to the spokes of vehicle wheels without requiring the use of tools.

It is a further object to provide a combined light reflector support and clamp for the spokes of vehicle wheels which may be simply and economically manufactured.

Other objects and advantages of the invention will become apparent during the course of the following description.

In the drawing I have shown several embodiments of the invention. In this showing—

Figure 1 is a front elevation of the invention as applied to the spokes of a vehicle wheel, Figure 2 is a back elevation thereof, Figure 3 is an end elevation of the invention with the extended tongues ready for positioning about the spokes of a wheel, Figure 4 is a front elevation of a modification of the invention as applied to the spokes of a vehicle wheel, Figure 5 is a rear elevation thereof, Figure 6 is an end elevation of the invention with the extended tongues ready for positioning about the spokes of a wheel, Figure 7 is a front elevation of a further modification of the invention partially secured to the spokes of a vehicle wheel, Figure 8 is a horizontal section taken on line 8—8 of Figure 7, and, Figure 9 is a front elevation of an additional modification of the invention.

Referring to Figures 1, 2 and 3 of the drawing the numeral 15 designates as a whole a sheet metal plate having a plurality of tongue members 16 stamped in each end thereof in such a manner that the lines of the bases of the sets of tongues of each end of the plate 15 are respectively parallel to lines which diverge toward one longitudinal edge of the plate for a purpose to be described. Preparatory to being placed in position on two adjacent spokes, these tongues may be bent outwardly away from the plate to a position perpendicular to the plane thereof by means of the fingers and without requiring the use of tools (Figure 3). Each end of the metal plate 15 has three or more of the tongues 16 stamped therein, the middle tongues extending toward the adjacent ends of the plate 15 while the outer tongues extend toward the central portion thereof. This arrangement permits a two-way clamping action of the tongues when placed about the spokes 17 of vehicle wheels, etc., as will be described.

A light reflecting element 18, of any desired material, such as glass or plastic, having a base member 19 is secured to the metal plate 15 by means of two projecting lugs 20 which are so positioned as to project through openings 21 provided in the plate 15. These projecting lugs 20 are retained in position in the openings 21 by riveting or heading the lugs, or by soldering in such manner that the heads of the lugs when thus secured are substantially flush with the rear side of the sheet metal plate 15.

It will become apparent that when once clamped to the spokes by bending the tongues 16 thereabout, the light reflecting assembly comprising the light reflecting element 18, its base member 19 and the sheet metal plate 15 is incapable of movement toward or away from the hub of the wheel. This is due to the stamping of the tongues 16 in the plate 15 so that their bases are diagonal and are parallel and closely adjacent to any two adjacent wheel spokes when mounted thereon. As a result, the inner tongues prevent radially inward movement of the light reflecting assembly with respect to the wheel while the outer tongues prevent radially outward movment.

In Figures 4, 5 and 6, a modification of the invention is disclosed wherein the light reflecting element 18 is mounted directly upon the metal plate 15. In this modification, the top and bottom edges 25 and 26 and the end edges 27 of the plate 15 are bent upwardly to clamp the edges of the light reflecting element 18 which may or may not be beveled, this operation of course taking place subsequent to the stamping of the tongues 16 in the plate 15. This form of the invention is more simply and economically assembled than the embodiment disclosed in Figures 1 to 3. When this embodiment is assembled, it is secured to the spokes of vehicle wheels as previously described.

In Figures 7 and 8, I have shown a further modification of the invention in which a light reflecting element 18 is secured to each side of the metal plate 15 which is modified in this instance so as to have a plurality of projecting tongue portions 28 at each end of the plate. The two light reflecting elements 18 are mounted in base members 19, and one of the base members is provided with a central screw-threaded opening 30, while the other is provided with a screw-threaded lug 30', which is adapted to project through a central opening 32 in the plate 15 and into the opening 30. It will be apparent that this modification may be quickly and easily attached to the spokes 17 of vehicle wheels, etc., as shown in Figures 7 and 8 by bending the tongues 28 about the adjacent spokes 17 to firmly clamp the same. As in the previously described embodiments of this invention, the plate 15 in Figures 7 and 8 is so formed that the lines of the bases of the two sets of tongues 28 are diagonal and are respectively parallel to any two adjacent wheel spokes so as to fit snugly thereabout when placed thereover.

In Figure 9, I have disclosed a further embodiment of the invention which is especially adapted for the mounting of a light reflecting element or elements upon wheels having larger spokes or to other supports such as the upper part of a bicycle fork. In this embodiment, the metal plate 15 is provided with a single reflecting element 18 suitably mounted upon the plate 15 which is provided with tongue portions 33 and 34 at one end thereof and a single tongue portion 35 having serrated edges at the other end.

The tongue portions 33 and 34 are provided at their bases with cutout portions 37 which are adapted to cooperate with the serrated edges of the tongue portion 35. This embodiment of the invention is secured to large spokes, etc., by first placing the portion of the plate 15 bearing the light reflecting element 18 in the desired position. The tongues 33 and 34 are then partially bent about the spoke, after which the single tongue 35 is inserted therebetween and in the cutout portions 37 and the tongues 33 and 34 are then bent downwardly over the tongue 35 along their diagonal fold lines 38 and 39 (Figure 9) to firmly clasp the tongue 35 and thus clamp the light reflecting element assembly to the spoke of the wheel. Although a more positive mounting is thus secured, the cooperating tongues need not be cutout or serrated but may depend solely upon the clamping action of the tongues 33 and 34 on the tongue 35.

It is now apparent that the light reflecting assembly described provides an extremely valuable warning signal which may be simply and easily detachably secured to the spokes of wheels, etc. If desired, such light reflecting assemblies may be used as novelties and be of any desired color or configuration. Moreover, they may be so placed upon the spokes of wheels as to not only produce a quickly and easily discernible warning signal but to provide rotating decorative light reflecting arrangements.

As previously mentioned, the light reflecting elements can be of any desired type such as are commonly used as highway warning signals or they may be simply flat reflecting units of plastic, etc., mounted over mirror metal. It is not intended that the light reflecting element and its support be restricted to use on the spokes of vehicle wheels as it is obvious that such an assembly is capable of use in other fields as light reflecting elements upon rotating elements. For example, such light reflecting assemblies may be placed for ornamental purposes upon Ferris wheels, wheels of chance, etc.

It is to be understood that the forms of my invention herewith shown and described are to be taken as preferred examples of the same and that various changes in the shape, size and arrangement of parts may be resorted to without departing from the spirit of the invention or the scope of the subjoined claims.

I claim:

1. A light reflecting assembly for wheel spokes comprising a plate having an opening and having flexible tongue members, and a light reflecting element mounted on each side of said plate and connected to each other through said opening, said tongue members being constructed and arranged to be bent over the spokes to support the assembly thereon.

2. A light reflecting assembly for wheel spokes comprising a plate having an opening and provided with flexible tongue members, light reflecting elements, a base for one of said elements having a screw-threaded opening therein, a base for a second of said elements having a screw-threaded lug thereon whereby said light reflecting elements may be connected to said plate and to each other through said opening in said plate, said tongue members being constructed and arranged to be bent about the spokes to support the assembly thereon.

3. A light reflecting assembly for wheel spokes comprising a plate having a pair of flexible tongues formed at one end thereof and a single tongue at its other end, said tongues being constructed and arranged to interlock with each other to support said plate upon the spokes, and light reflecting means connected to said plate.

4. In combination with a pair of radially diverging wheel spokes, a light reflecting assembly comprising light reflecting elements, a support therefor, means connecting said elements to said support and to each other, said support having a set of flexible tongue members parallel to and arranged to be bent over each of said spokes to secure said assembly thereto.

5. In combination with a pair of radially diverging wheel spokes, a light reflecting assembly therefor comprising a light reflecting element and a support therefor, said support comprising a plate having sides and ends constructed and arranged to be bent over and clamp said element, and a set of flexible tongue members integral with said plate and parallel to and arranged to be bent over each of said spokes to prevent radial movement of said assembly.

6. A light reflector unit comprising a base plate formed of a single sheet of flat flexible material and having a substantial portion of its area relatively flat and unbroken, a reflector unit secured against said portion of the area of the base plate, the base plate having attaching tongues formed of the sheet material thereof outwardly of said portion of the area of the base plate, the sheet material being of such character that said tongues when bent around a supporting object, will retain their bent form and support the unit with respect to such object, said tongues being arranged at opposite ends of the unit and at least two of the tongues being arranged adjacent one end of the unit and disposed with respect to a predetermined line against which may lie an object to which the unit is to be attached to facilitate the bending of said last named tongues around the object.

7. In combination with a pair of radially diverging wheel spokes, a light reflecting assembly comprising a light reflecting element, a support for said element formed from flat sheet material, and a pair of sets of tongues integral with said support, said sets of tongues being arranged parallel to lines diverging from each other at the same angle as the wheel spokes whereby, when two of the spokes are arranged to coincide with said lines, said tongues are adapted to be bent over the respective spokes to support the assembly with respect thereto.

HARRY S. FIKE.